United States Patent
Jiang et al.

(10) Patent No.: US 10,383,114 B2
(45) Date of Patent: Aug. 13, 2019

(54) ON CO-CHANNEL SIDELINK LTE V2V AND DSRC COMMUNICATION

(71) Applicant: QUALCOMM Incorporated, San Diego, CA (US)

(72) Inventors: Libin Jiang, Bridgewater, NJ (US); Shailesh Patil, Raritan, NJ (US); Peter Gaal, San Diego, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 15/400,285

(22) Filed: Jan. 6, 2017

(65) Prior Publication Data

US 2017/0280445 A1    Sep. 28, 2017

Related U.S. Application Data

(60) Provisional application No. 62/313,044, filed on Mar. 24, 2016.

(51) Int. Cl.
*H04W 72/04* (2009.01)
*H04L 12/807* (2013.01)
(Continued)

(52) U.S. Cl.
CPC ......... *H04W 72/0446* (2013.01); *H04L 47/27* (2013.01); *H04W 40/244* (2013.01); *H04W 74/0808* (2013.01); *H04W 74/0816* (2013.01)

(58) Field of Classification Search
None
See application file for complete search history.

(56) References Cited

U.S. PATENT DOCUMENTS

| | | | |
|---|---|---|---|
| 2008/0259847 A1* | 10/2008 | Chou | H04W 84/18 370/328 |
| 2009/0047902 A1* | 2/2009 | Nory | H04W 52/10 455/13.4 |

(Continued)

FOREIGN PATENT DOCUMENTS

WO    2014110513 A1    7/2014

OTHER PUBLICATIONS

International Search Report and Written Opinion—PCT/US2017/019735—ISA/EPO—dated Jun. 9, 2017.

(Continued)

*Primary Examiner* — Alpus Hsu
*Assistant Examiner* — Camquyen Thai
(74) *Attorney, Agent, or Firm* — Clint R. Morin; Arent Fox, LLP

(57) ABSTRACT

Improvement in co-existence of the LTE device-to-device communication with another device-to-device communication method is desired. The apparatus selects a countdown number within a size of a contention window including a plurality of slots before a target subframe. The apparatus determines whether each slot of the plurality of slots is idle or utilized while waiting for the target subframe. The apparatus counts down the countdown number during each of the determined idle slots. The apparatus determines whether the countdown number has reached a threshold number before the target subframe. The apparatus performs, when the countdown number is determined to have reached the threshold number, one of: deferring from transmitting until the target subframe, or transmitting a CUBS until a next subframe or the target subframe.

28 Claims, 14 Drawing Sheets

(51) Int. Cl.
*H04W 40/24* (2009.01)
*H04W 74/08* (2009.01)

(56) References Cited

U.S. PATENT DOCUMENTS

| | | | | |
|---|---|---|---|---|
| 2009/0109938 A1* | 4/2009 | Singh | ............... | H04W 74/0816 |
| | | | | 370/337 |
| 2009/0262671 A1* | 10/2009 | Seol | ............... | H04W 72/0413 |
| | | | | 370/281 |
| 2009/0316611 A1* | 12/2009 | Stratford | ............... | H04J 3/0608 |
| | | | | 370/294 |
| 2010/0074263 A1* | 3/2010 | Bry | ............... | H04L 12/2834 |
| | | | | 370/401 |
| 2011/0021146 A1* | 1/2011 | Pernu | ............... | H04W 88/06 |
| | | | | 455/41.2 |
| 2011/0206016 A1* | 8/2011 | Denteneer | ............... | H04W 74/0816 |
| | | | | 370/336 |
| 2013/0203429 A1* | 8/2013 | Kneckt | ............... | H04W 72/1263 |
| | | | | 455/450 |
| 2015/0327297 A1* | 11/2015 | Nilsson | ............... | H04W 72/1215 |
| | | | | 370/336 |
| 2015/0382374 A1* | 12/2015 | Bhorkar | ............... | H04W 24/00 |
| | | | | 370/330 |
| 2016/0007322 A1* | 1/2016 | Agardh | ............... | H04W 72/04 |
| | | | | 370/329 |
| 2016/0057770 A1 | 2/2016 | Yerramalli et al. | | |
| 2016/0105897 A1* | 4/2016 | Liu | ............... | H04W 72/1226 |
| | | | | 370/235 |
| 2016/0183286 A1* | 6/2016 | Park | ............... | H04W 72/02 |
| | | | | 370/329 |
| 2016/0191417 A1* | 6/2016 | Lutz | ............... | H04W 72/0486 |
| | | | | 370/336 |
| 2016/0278078 A1* | 9/2016 | Cheng | ............... | H04W 72/0446 |

OTHER PUBLICATIONS

Mediatek Inc: "Uplink Channel Access in LAA", 3GPP TSG RAN WG1 Meeting #84, R1-160976, Feb. 24, 2016, XP051079075, Retrieved from the Internet: URL:http://www.3gpp.org/ftp/tsg.ran/WG1_RL 1/TSGR1_84/Docs/, 11 pages.

* cited by examiner

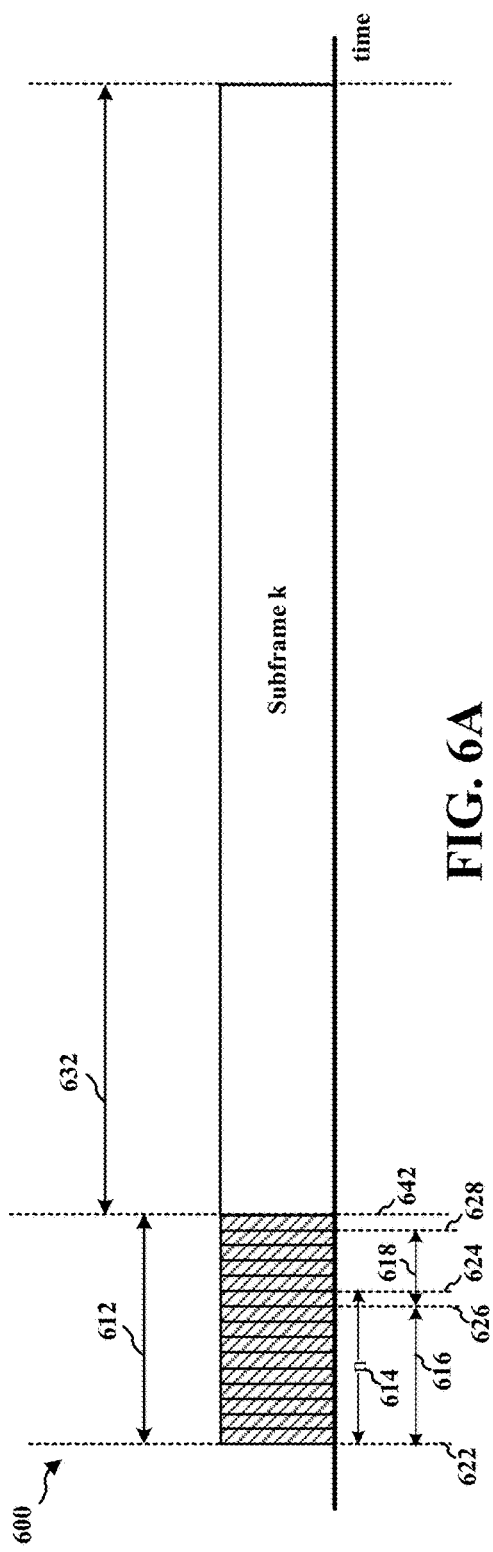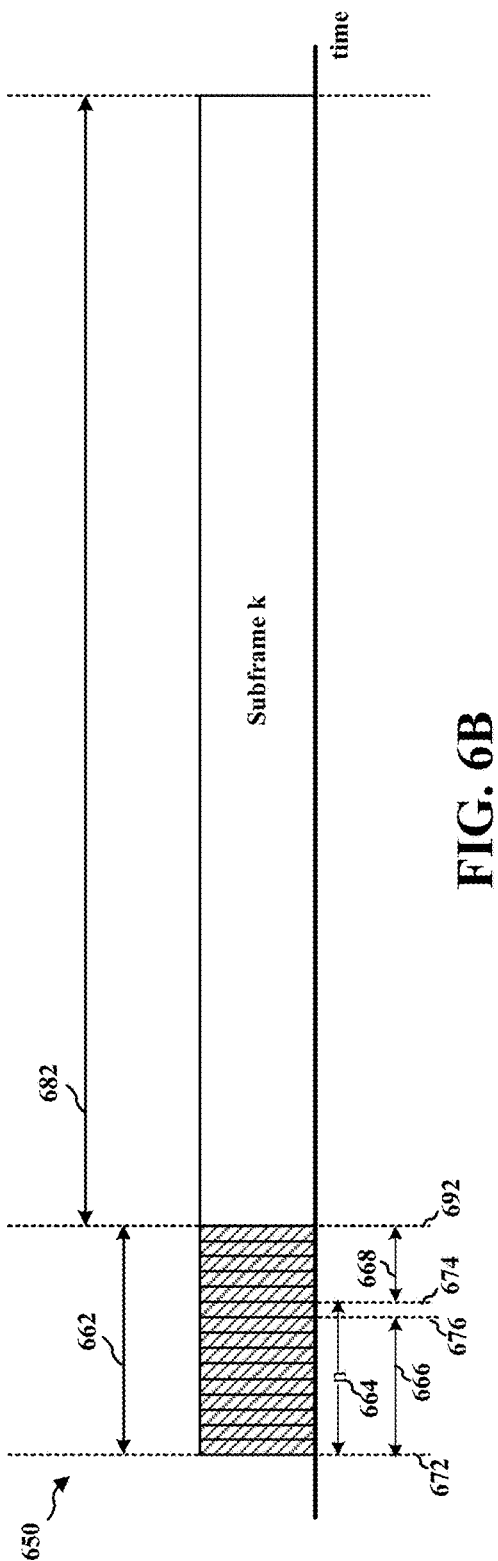

ON CO-CHANNEL SIDELINK LTE V2V AND DSRC COMMUNICATION

CROSS-REFERENCE TO RELATED APPLICATION(S)

This application claims the benefit of U.S. Provisional Application Ser. No. 62/313,044, entitled "CO-CHANNEL SIDELINK LTE V2V AND DSRC" and filed on Mar. 24, 2016, which is expressly incorporated by reference herein in its entirety.

BACKGROUND

Field

The present disclosure relates generally to communication systems, and more particularly, to vehicle-to-vehicle communication.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

Device-to-device communication using LTE has been under development to provide a way for a wireless device to directly communicate with another wireless device in LTE. Improvements are being continuously made to provide reliable device-to-device communication in LTE in various circumstances, such as vehicle-to-vehicle communication.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Device-to-device communication using LTE, especially in a vehicle-to-vehicle communication setting may provide advantages due to the LTE characteristics, such as synchronization in transmission, frequency-division modulation (FDM), and a coding gain. Unlike several other device-to-device communication methods, device-to-device communication using LTE is in half-duplex, and thus such characteristic needs to be considered. Improvement in co-existence of the LTE device-to-device communication with another device-to-device communication method is desired.

In an aspect of the disclosure, a method, a computer-readable medium, and an apparatus are provided. The apparatus may be a wireless device. The apparatus selects a countdown number within a size of a contention window including a plurality of slots before a target subframe. The apparatus determines whether each slot of the plurality of slots is idle or utilized while waiting for the target subframe. The apparatus counts down the countdown number during each of the determined idle slots. The apparatus determines whether the countdown number has reached a threshold number before the target subframe. The apparatus performs, when the countdown number is determined to have reached the threshold number, one of: deferring from transmitting until the target subframe, or transmitting a channel usage beacon signal (CUBS) until a next subframe or the target subframe.

In an aspect, the apparatus may be a wireless device. The apparatus includes means for selecting a countdown number within a size of a contention window including a plurality of slots before a target subframe. The apparatus includes means for determining whether each slot of the plurality of slots is idle or utilized while waiting for the target subframe. The apparatus includes means for counting down the countdown number during each of the determined idle slots. The apparatus includes means for determining whether the countdown number has reached a threshold number before the target subframe. The apparatus includes means for performing, when the countdown number is determined to have reached the threshold number, one of: deferring from transmitting until the target subframe, or transmitting a channel usage beacon signal (CUBS) until a next subframe or the target subframe.

In an aspect, the apparatus may be a wireless device that includes a memory and at least one processor coupled to the memory. The at least one processor is configured to: select a countdown number within a size of a contention window including a plurality of slots before a target subframe, determine whether each slot of the plurality of slots is idle or utilized while waiting for the target subframe, count down the countdown number during each of the determined idle slots, determine whether the countdown number has reached a threshold number before the target subframe, and perform, when the countdown number is determined to have reached the threshold number, one of: deferring from transmitting until the target subframe, or transmitting a channel usage beacon signal (CUBS) until a next subframe or the target subframe.

In an aspect, a computer-readable medium storing computer executable code comprises code to: select a countdown number within a size of a contention window including a plurality of slots before a target subframe, determine whether each slot of the plurality of slots is idle or utilized while waiting for the target subframe, count down the countdown number during each of the determined idle slots, determine whether the countdown number has reached a threshold number before the target subframe, and perform, when the countdown number is determined to have reached the threshold number, one of: deferring from transmitting until the target subframe, or transmitting a channel usage beacon signal (CUBS) until a next subframe or the target subframe.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6A is an example diagram illustrating a first method in a first aspect of the disclosure FIG. 6B is an example diagram illustrating a second method in the first aspect of the disclosure.

DETAILED DESCRIPTION

Figure 1:
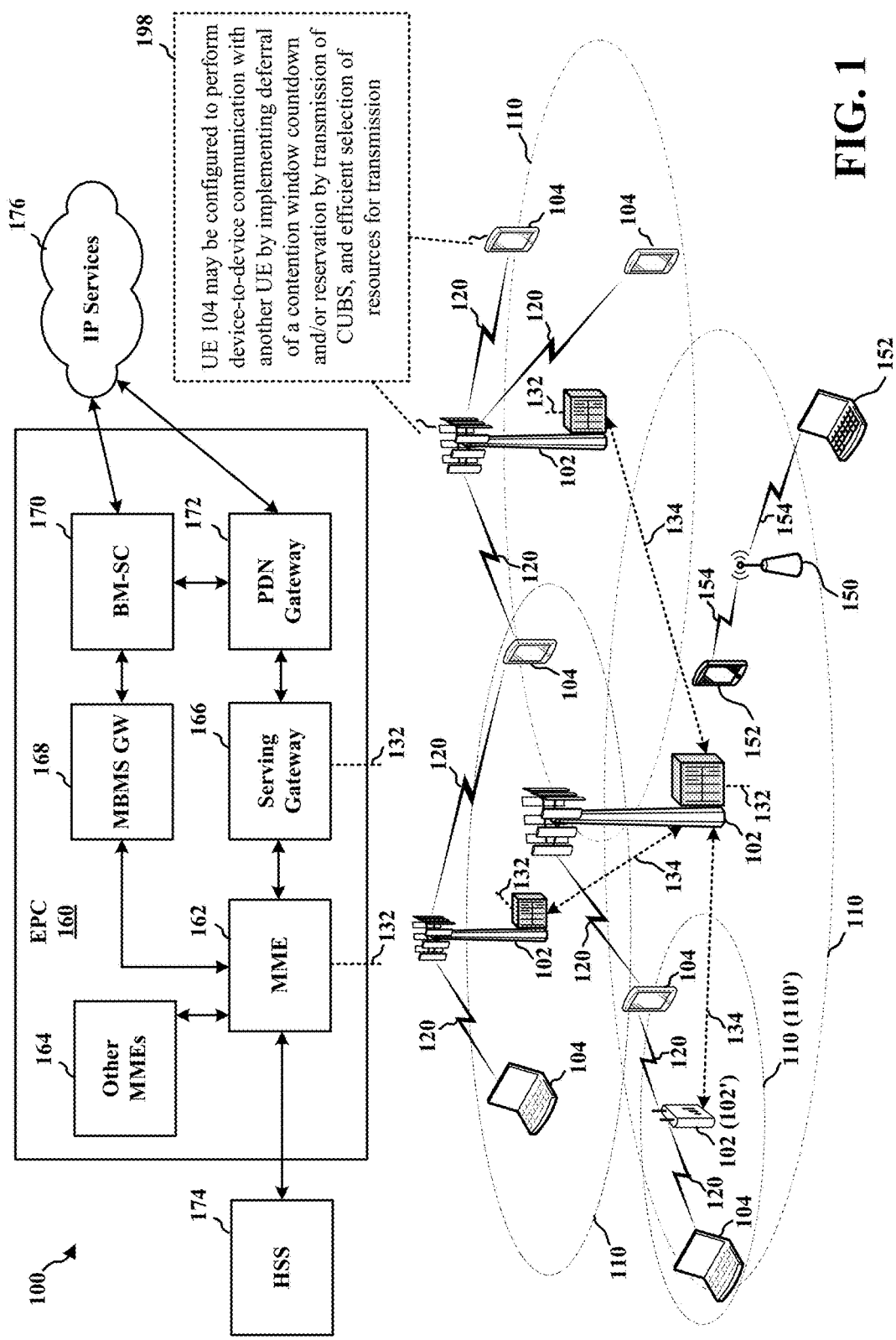
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS)

Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to perform device-to-device communication with another UE by implementing deferral of a contention window countdown and/or reservation by transmission of CUBS, and efficient selection of resources for transmission. (198).

Figure 2:
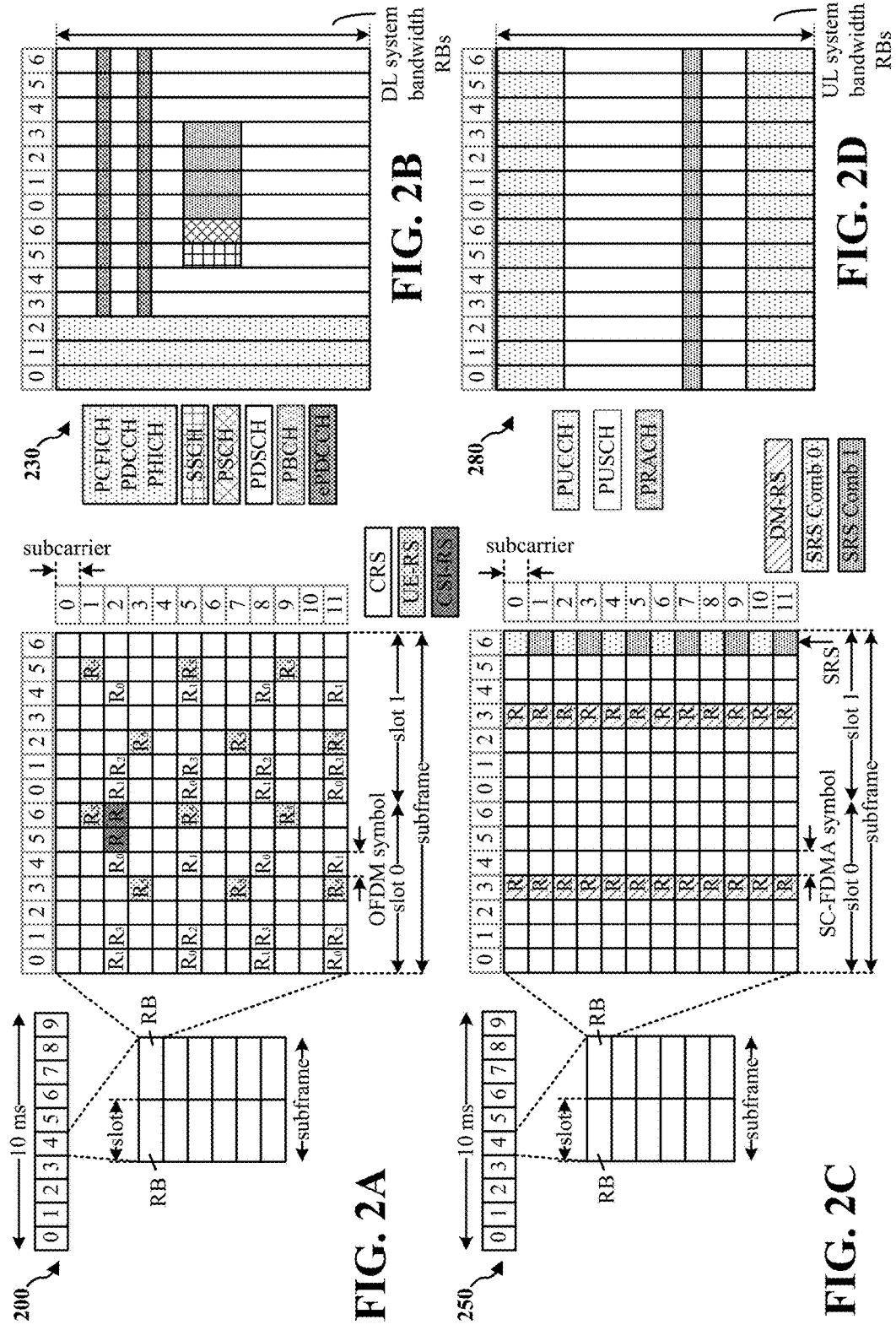
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
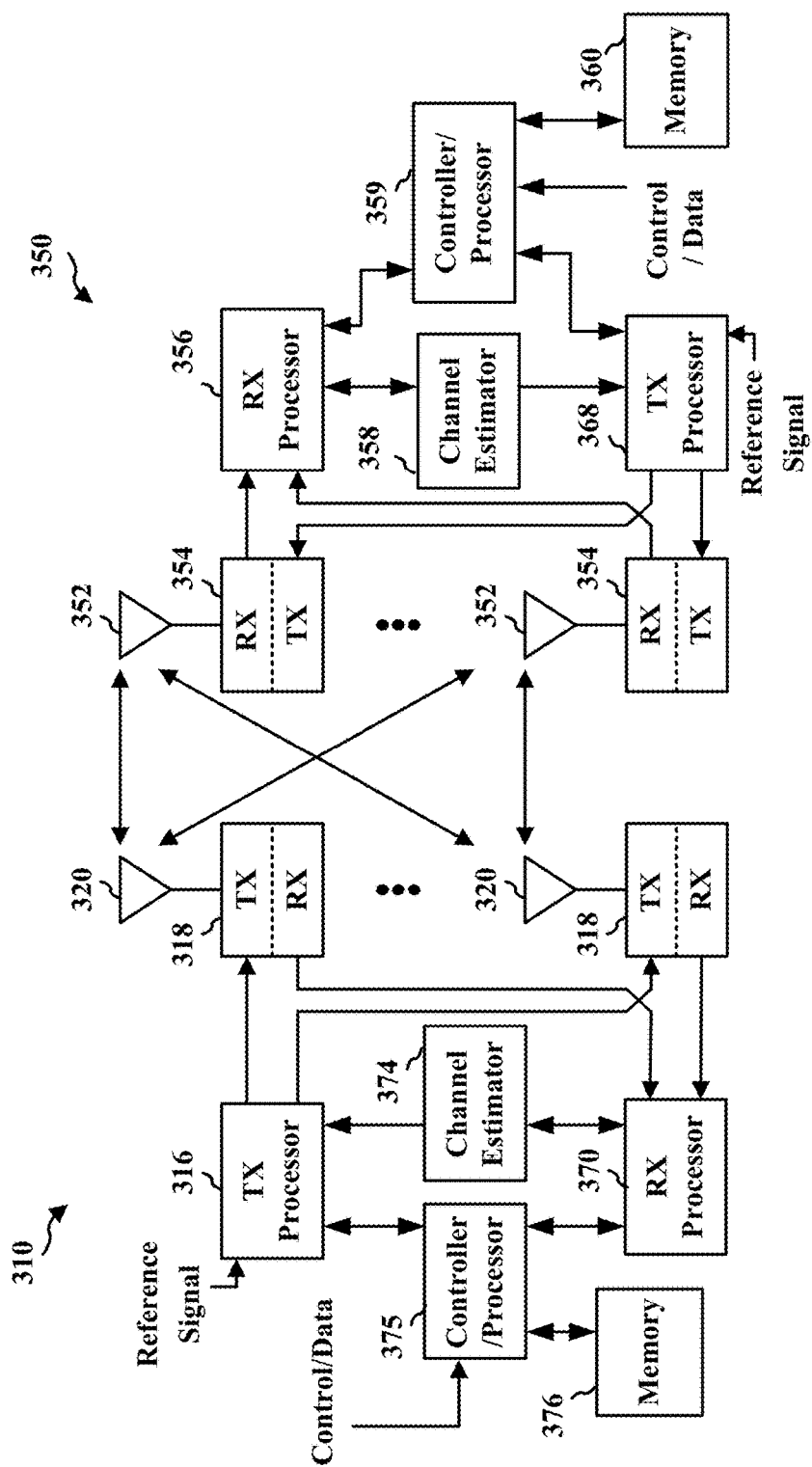
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
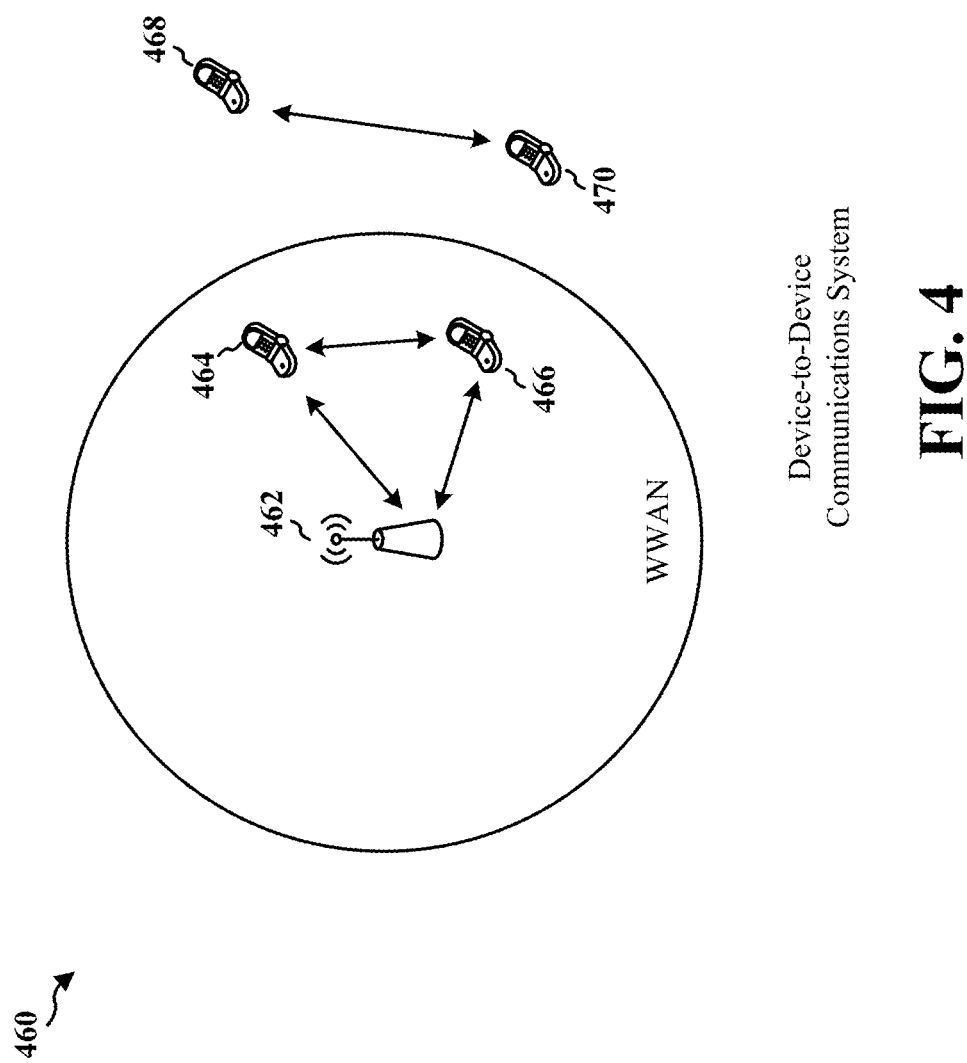
FIG. 4 is a diagram of a device-to-device communications system.

FIG. 4 is a diagram of a device-to-device (D2D) communications system 460. The D2D communications system 460 includes a plurality of UEs 464, 466, 468, 470. The D2D communications system 460 may overlap with a cellular communications system, such as for example, a WWAN. Some of the UEs 464, 466, 468, 470 may communicate together in D2D communication using the DL/UL WWAN spectrum, some may communicate with the base station 462, and some may do both. For example, as shown in FIG. 4, the UEs 468, 470 are in D2D communication and the UEs 464, 466 are in D2D communication. The UEs 464, 466 are also communicating with the base station 462. The D2D communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH).

The exemplary methods and apparatuses discussed infra are applicable to any of a variety of wireless D2D communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

D2D communication may be used to provide direct communication between devices. D2D communication enables a first device to communicate with a second device and to transmit data to the second device over allocated resources. One use for the D2D communication is a vehicle-to-vehicle (V2V) communication and vehicle-to-everything (V2X) communication. Thus, according to the V2V communication, a first vehicle's device may perform D2D communication with another vehicle's device. According to the V2X communication, a vehicle's device may perform D2D communication with another device, regardless of whether that the device resides in a vehicle or not.

One type of communication that may be used for V2V communication is dedicated short range communication (DSRC). The DSRC is a short-range wireless communication capability, typically based on IEEE 802.11p that is similar to Wi-fi. In the DSRC, before transmission, a device may examine a channel. If the channel is busy (e.g., another device is transmitting on the channel), the device does not transmit on the channel, in order to avoid a collision with another device transmitting on the channel. If the device determines that the channel has become idle, the device will wait for a waiting time and then transmit on the channel after the wait time has elapsed, where the wait time may be a randomized time period. The wait time also reduces collisions. For example, if the wait time is not implemented, several devices may attempt to transmit on the same channel at the same time immediately after the devices find out that the channel has become idle, which may cause collisions by the devices simultaneously transmitting on the same channel. If each of the devices randomizes the wait time, different devices may wait for different wait time periods. Thus, when the channel becomes idle, a first device with the shortest wait time period may transmit on the channel, and other devices with longer wait time periods will determine that the channel has become busy again due to the first device transmitting on the channel. While the first device is transmitting on the channel, the other devices may refrain from transmitting on the channel, thus avoiding a collision. Recently, implementing other types of communication such as LTE communication for V2V communication have been under development. For example, LTE direct (LTE-D) may be utilized for V2V communication, over a licensed spectrum and/or an unlicensed spectrum.

Figure 5:
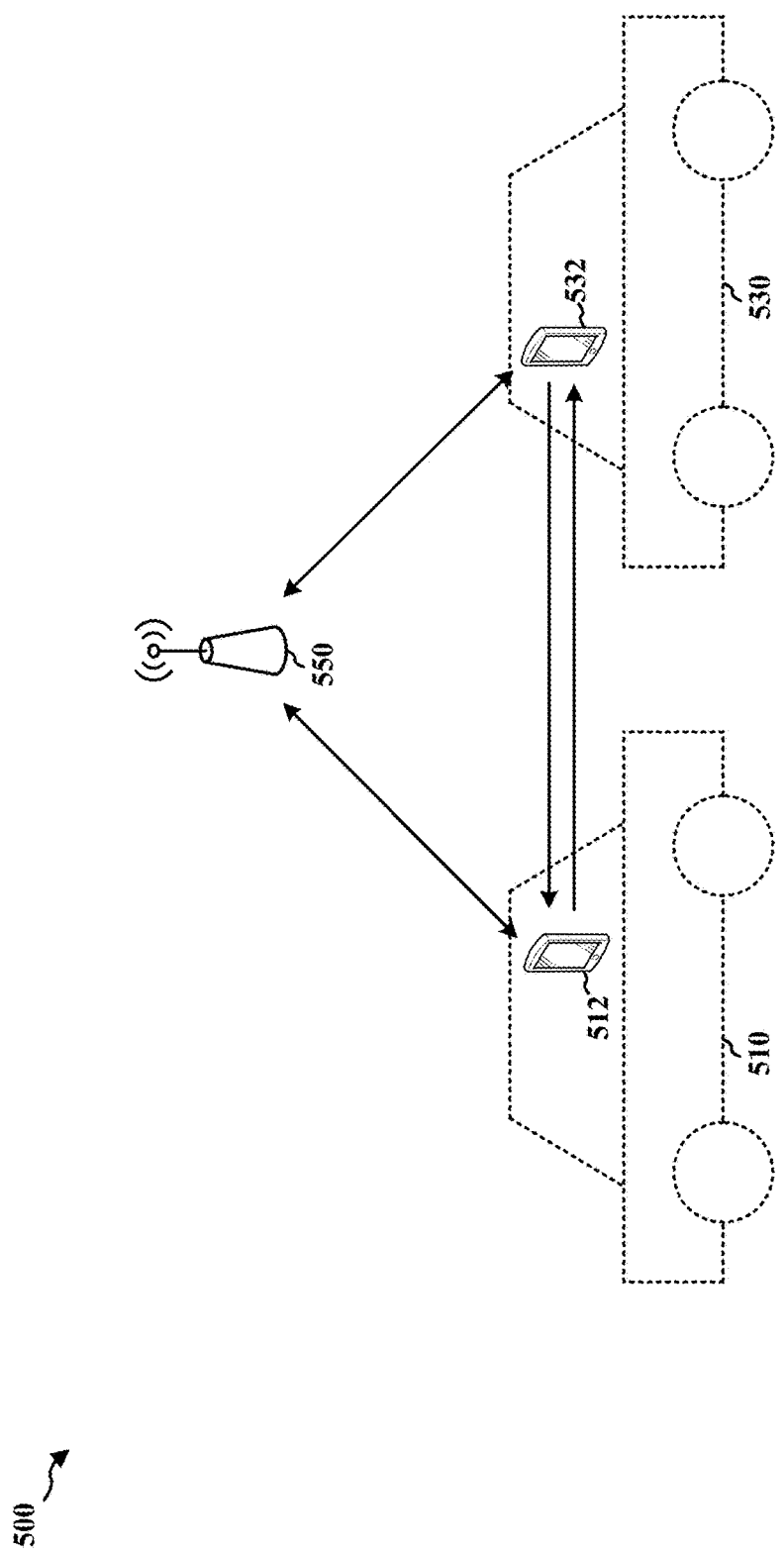
FIG. 5 is an example diagram illustrating vehicle-to-vehicle communication.

FIG. 5 is an example diagram 500 illustrating V2V communication. A first device 512 is present in a first vehicle 510, and thus may travel with the first vehicle 510. A second device 532 may be present in a second vehicle 530. In another aspect, the first device 512 may be present independently from the first vehicle 510 or may be a part of the first vehicle 510. The second device 532 may be present independently from the second vehicle 530, or may be a part of the second vehicle 530. The first device 512 and the second device 532 may be served by a base station 550. The first device 512 and the second device 532 are configured to perform D2D communication with each other (e.g., over LTE and/or over IEEE 802.11p).

V2V communication based on LTE (LTE V2V communication) may coexist with IEEE 802.11p (e.g., DSRC based on IEEE 802.11p). The coexistence of the LTE V2V communication with IEEE 802.11p may be similar to coexistence of LTE in an unlicensed spectrum with Wi-Fi, for example, via license assisted access (LAA). For example, such coexistence may occur around 5 GHz. There are also differences between the coexistence of the LTE V2V communication with IEEE 802.11p and the coexistence of the LAA with Wi-Fi. Although the following discussion refers to LTE V2V communication, it is noted that the LTE V2V communication is similar to the LTE D2D communication, and thus following discussion may also apply to the LTE D2D communication and/or LTE V2X communication.

Differences in the coexistence of the LTE V2V communication with IEEE 802.11p when compared with coexistence of the LAA with Wi-Fi are as follows. Because devices may perform LTE V2V communication directly with each other without going through a base station, the devices should be able to autonomously select resources for the LTE V2V communication, without relying on the base station. Thus, devices may perform LTE V2V communication both in coverage or out of coverage upon autonomously selecting resources for the communication.

Both LTE V2V communication and IEEE 802.11p may utilize a fixed contention window (CW) (e.g., for listen-before-talk (LBT)). For example, the CW may be a fixed CW for a category 3 LBT. Before transmitting LTE V2V communication, a device may (randomly) select a countdown number within the CW size. For example, if the CW size is 15, the device may randomly select any number between 0 and 15 as the countdown number, where the selected countdown number corresponds to a wait time before the transmission to another UE. Each number increment within the CW size may correspond to a slot. Thus, the CW size may correspond to the number of slots. For example, if a slot size is 9 microseconds, and if the CW size is 15 and the selected countdown number is 10, the CW may be 135 microseconds long, and the wait time may be 90 microseconds long. The device determines whether the medium (e.g., the medium corresponding to the slots) is idle or utilized, before reaching a target subframe that is used for transmission (e.g., via V2V communication). If the device determines that the medium is idle, the device will wait until the selected countdown number is counted down to 0 (e.g., decremented from the countdown number to 0) (thus waiting for the wait time) before the transmission occurs. In particular, the device starts a countdown from the selected countdown number when the medium becomes idle. For example, if the selected countdown number is 10, the device starts a countdown from 10 (or 90 microseconds). The device pauses the countdown when the medium becomes busy during the countdown. The device resumes the countdown when the medium becomes idle again. Thus, the device incrementally decreases the countdown number over time when the medium is idle but does not decrease the countdown number when the medium is busy. When the selected countdown number is counted down to 0, the device may transmit on the medium, on a subframe after the CW. It is noted that, LTE V2V transmission may be a broadcast transmission that does not trigger a feedback response such as an acknowledgement (ACK) or negative acknowledgment (NACK).

The LTE V2V communication may be different from the LAA in that the LTE V2V communication is half-duplex communication. In the LTE V2V communication, while a device is performing transmission, the device may not be able to receive communication. Similarly, in the LTE V2V communication, while the device is receiving communication, the device may not be able to perform transmission. Thus, in the LTE V2V communication, for example, while two devices are transmitting to each other at the same time, the two devices may not be able to receive from each other. Therefore, the half-duplex issue with the LTE V2V communication should be addressed.

LTE V2V communication may provide more reliable performance than IEEE 802.11p at least because the LTE V2V communication provides synchronization in transmission, frequency-division modulation (FDM), and a coding gain. Hence, development of the FDM operations when a device autonomously selects a resource for transmission is desired, in order to have different frequencies in a channel available for transmission. Sensing in a time domain and a frequency domain with semi-persistent transmissions may lead to reliable performance for LTE V2V transmission. In particular, the device may determine which time frame (e.g., subframe) and which frequency are occupied by another device's transmission and thus are unavailable (busy), and may determine which time frame and which frequency are idle and thus are available. For example, if a channel is 10 MHz wide, in order to enable the FDM, the device may need to determine which frequency within the channel is busy or idle. Therefore, an effective approach to sense transmission in a time domain and a frequency domain is desired to determine which resource (e.g., in time and/or frequency) is available. In semi-persistent transmission, if a device selects a resource (e.g., in the time domain and in the frequency domain), the device utilizes the selected resource periodically (e.g., every 100 msec) for transmission, which makes the transmission traffic by the device predictable. Thus, for example, if the device utilizes the selected resource every 100 msec, other devices may avoid utilizing the selected resource every 100 msec.

In a first aspect of the disclosure, before a device performs a transmission, the device senses other transmissions by other devices. All devices (e.g., all vehicle devices) may have a common notion of timing and have a common mapping from the timing to a subframe boundary. Subframes may not be contiguous, and thus may have a time gap between the subframes so as to allow time for one or more of transmission-reception turnaround, a distributed coordination function (DCF) interframe space (DIFS), and sensing time. The time gap may be pre-configured at the device or may be configured by a base station. The device may utilize a contention window (e.g., for LBT) with a countdown number to determine when to perform transmission, where the device may perform countdown of the countdown number while sensing transmissions by other devices during the time gap between the subframes. The device performs the countdown when the medium is idle (e.g., no transmissions by other devices are sensed), and may pause the countdown when the medium is busy (e.g., transmissions by other devices are sensed).

In the first aspect of the disclosure, there may be at least two approaches to determine a size of the contention window (and a countdown number). According to a first approach of the first aspect, a size of the contention window may be a fixed window size. A device may select a countdown number n, where n is selected within the size of the contention window. In an aspect, a fixed number for the size of the contention window may be preconfigured or may be configured by a base station. For example, if the contention window size is 15, the countdown number n is selected from a number between 0 and 15. The countdown number n may be the same for all devices. For example, the countdown number n may be the same for all devices as a function of a current time. For example, the countdown number n may be the same for all devices within a same geographical area. The geographical area of a device may be determined by a location sensor such as a GPS device. To choose the same n by different devices, a random number generator may be implemented (according to the same random number seed, based on a location) to generate the same n for all devices. In an aspect, there is a function that maps the location to the seed. Hence, locally, devices may have the same random number. For example, the random number generator may be implemented in a base station that is configured to inform the devices that the countdown number is n.

According to the second approach of the first aspect, the size of the contention window may vary (e.g., based on a congestion level). In particular, if a congestion level is high (e.g., due to a large number of devices attempting to transmit), the device may increase the size of the contention window. For example, if a larger number of devices attempt to transmit on the resource (e.g., time-frequency resource), the likelihood of collision is higher. Thus, with an increased congestion level, the size of the contention window is increased. In an aspect, the congestion level may be estimated based on a number of interruptions (e.g., due to a busy resource) in countdown of the countdown number. Thus, for a higher number of interruptions, the device determines that the congestion level is high, and thus increases the size of the contention window. For example, if the number of interruptions exceeds a threshold number, then the device may increase the window size for the contention window (e.g., by doubling the window size of the contention window). The threshold number may be preconfigured or is received from a base station. To determine the number of interruptions, the device may count the number of interruptions before the countdown reaches 0. The size of the contention window may be increased based on an exponential backoff algorithm. As discussed above, a device may select a countdown number n, where n is selected within the size of the contention window. Further, as discussed above, the countdown number n may be the same for all devices. For example, the countdown number n may be the same for all devices as a function of a current time. For example, the countdown number n may be the same for all devices within a same geographical area.

As discussed supra, the device may select a countdown number within the contention window size, which may be determined based on at least one of the first approach or the second approach of the first aspect of the disclosure. When the device performs a countdown from the selected countdown number, the device considers a target subframe. It is noted that the device may start transmitting data (i.e., a V2V communication message) at a subframe boundary, and may not be able to start transmitting data if the device has not reached the subframe boundary. Thus, the device may not be able to transmit immediately after the countdown reaches 0 if the subframe boundary has not been reached. The device may determine whether the countdown reaches a certain threshold number (e.g., 1). If the countdown reaches the threshold number (e.g., 1) before reaching the target subframe, two different methods of self-deferring may be employed to utilize the target subframe for transmission. According to a first method, if the countdown reaches a threshold number (e.g., 1) before reaching the target subframe, the device may defer the countdown until the subframe boundary for the target subframe is reached. In particular, the device may stop counting down after the countdown reaches 1, and wait until the subframe boundary for the target subframe is reached. If the subframe boundary is reached, the device determines whether the resource is idle or busy. If the resource is idle, the device counts down to 0 and starts transmitting on the target subframe. According to a second method, if the countdown reaches a threshold number (e.g., 1) before reaching the target subframe, the device may proceed to counting down to 0 and then transmit a CUBS until the subframe boundary for the target subframe is reached. Because the subframe boundary is not reached when the countdown reaches 0, the device does not transmit the V2V communication message yet even when the countdown reaches 0. Instead, when the countdown reaches 0 and the subframe boundary for the target subframe is not yet reached, the device transmits a CUBS to occupy (and reserve) the resource until the subframe boundary is reached. Once the subframe boundary is reached, the device may transmit on the target subframe.

Use of the CUBS to occupy a resource may have the following effects. Transmitting the CUBS prevents the communication via 802.11p from utilizing a resource (e.g., medium) during deferral. Transmitting the CUBS may cause some LTE V2V devices to refrain from transmitting. Transmitting the CUBS is likely to be more suitable for the case where all LTE V2V devices select the same countdown number, at least locally.

FIGS. 6A and 6B illustrate two methods in the first aspect of the disclosure. FIG. 6A is an example diagram 600 illustrating a first method in the first aspect of the disclosure.

In the example diagram 600, a contention window 612 has a window size of 15 with 15 slots, and the device has selected 10 as a countdown number (n=10). Thus, if the device counts down over the countdown time period 614 that includes 10 slots, the countdown starts at 622 and is supposed to end at 624. When the device counts down nine slots over a countdown period 616 and thus the countdown reaches 1 at 626, the subframe boundary 642 for the target subframe 632 (subframe k) is not reached yet. Thus, the device starts deferring at 626 until 628 where the subframe boundary 642 is one slot (one countdown) away, over the defer time period 618. After deferring over the defer time period 618, if the medium is idle, the device counts down to 0 at 642 and starts transmitting on the target subframe 632.

FIG. 6B is an example diagram 650 illustrating a second method in the first aspect of the disclosure. In the example diagram 600, a contention window 662 has a window size of 15 with 15 slots, and the device has selected 10 as a countdown number (n=10). Thus, if the device counts down over the countdown time period 664 that includes 10 slots, the countdown starts at 672 and is supposed to end at 674. When the device counts down nine slots over a countdown period 666 and thus the countdown reaches 1 at 676, the subframe boundary 692 for the target subframe 682 (subframe k) is not reached yet. At this point, the device proceeds to counting down to 0 at 674 and starts transmitting a CUBS at 674 over a CUBS transmission period 668, until the subframe boundary 692 for the target subframe 682 is reached, to reserve a resource. When reaching the subframe boundary 692, the device starts transmitting on the target subframe 632.

If the countdown has not reached a threshold number (e.g., 1) when the target subframe is reached, a third method may be implemented to utilize a next subframe that is subsequent to the target subframe for transmission. According to the third method, if the countdown has not reached a threshold number (e.g., 1) when the target subframe boundary is reached and thus the device cannot transmit using the target subframe yet, the device may set the next subframe as a new target subframe. Before the subframe boundary for the next subframe is reached, the device may continue the countdown to 0 and start transmission on the next subframe. If the subframe boundary of the next subframe is not reached when the countdown is at 1, the device may employ at least one of the first method or the second method described above, to defer the countdown until the subframe boundary or to transmit the CUBS until the subframe boundary, and then counts down to 0 to start transmission using the next subframe.

Figure 7:
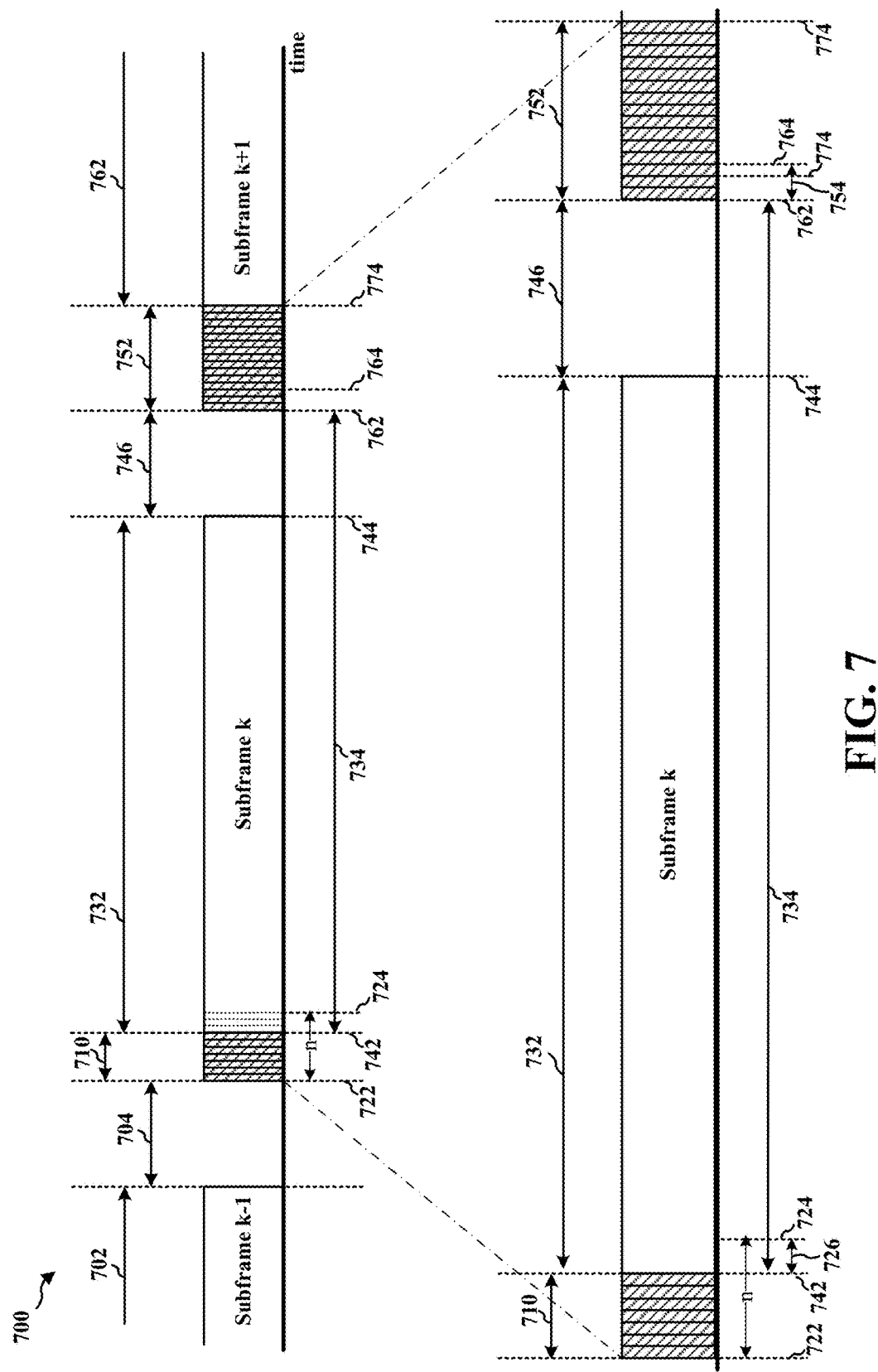
FIG. 7 is an example diagrams illustrating a third method of the first aspect of the disclosure.

FIG. 7 is an example diagram 700 illustrating a third method of the first aspect of the disclosure. It is noted that the bottom half of the example diagram 700 illustrates a portion between 722 and 774 that is enlarged. After a previous subframe 702 (subframe k−1), the device may defer to the DIFS 704. After the DIFS, the device selects a countdown number n within a CW size. In the example diagram 700, the device has selected the countdown number of 10. Thus, the device starts the countdown at 722, counting down over the countdown time period 710. However, in the example diagram 700, the subframe boundary 742 is reached when the device counts down to 3 at the end of the countdown time period 710, which is before the device counts down to 1. Because the subframe boundary is reached before the device counts down to 1, the device determines to defer the countdown in order to utilize a next subframe 762 (subframe k+1) following after the current target subframe 732 (subframe k). Thus, the countdown is deferred for the defer time period 734 until the end of a DIFS 746 at 762. Because the remaining countdown is 3, the device counts down the remaining 3 slots over the next countdown time period 754. When the device counts down to 1 at 772, the subframe boundary 774 for the next subframe 762 is not reached. Thus, the device may utilize either the first method of the second method as discussed above, to defer the further countdown to 0 until the subframe boundary 774 or to transmit the CUBS until the subframe boundary 774. That is, the device may not countdown to 0 at 764 if the subframe boundary 774 for the next subframe 762 is not reached.

In a second aspect of the disclosure, the device may select a resource for LTE V2V communication based on the following approaches. According to a first approach of the second aspect, the device measures energy received on the subframes for LTE over a period of time (e.g., 100 msec, where each subframe is 1 msec long), and selects a subframe and a frequency that provide low received energy. For example, after measuring the energy on the subframes at different frequencies, the device may check each subframe and determine the energy level at different frequencies in each subframe. If the device has not selected a target subframe, the device may select a target subframe and a frequency in the target subframe that provide a low energy level. The device may determine that the energy level is low if the energy level is less than or equal to an energy threshold. If the device already has determined a target subframe, the device may determine whether the energy level at the target subframe and a frequency for the target subframe is high (e.g., greater than the energy threshold). If the energy level at the target subframe and at the frequency for the target subframe is high (e.g., greater than the energy threshold), the device may reselect another subframe as a new target subframe. For example, in such an instance, the device may reselect another subframe and a frequency that provide low energy level (e.g., less than or equal to the energy threshold).

The device may listen on a current resource periodically to measure an energy level on the current resource. Due to the half-duplex nature, in the LTE V2V communication, the device cannot listen while transmitting on the resource. Thus, in the LTE V2V communication, the device may stop transmitting periodically to listen on the current resource and measure an energy level. After measuring the energy level of the current resource, the device may compare the energy level on the current resource with other resources. If the energy level on the current resource is high (e.g., greater than the energy threshold), the device may reselect to another resource whose energy level is low (e.g., less than or equal to the energy threshold).

According to a second approach of the second aspect, the device may randomly select a target subframe and a frequency for the target subframe. For example the device may randomly select a target subframe and a frequency for the target subframe periodically. The second approach may be advantageous especially for a low density situation where a number of occupied resources is low.

Figure 8:
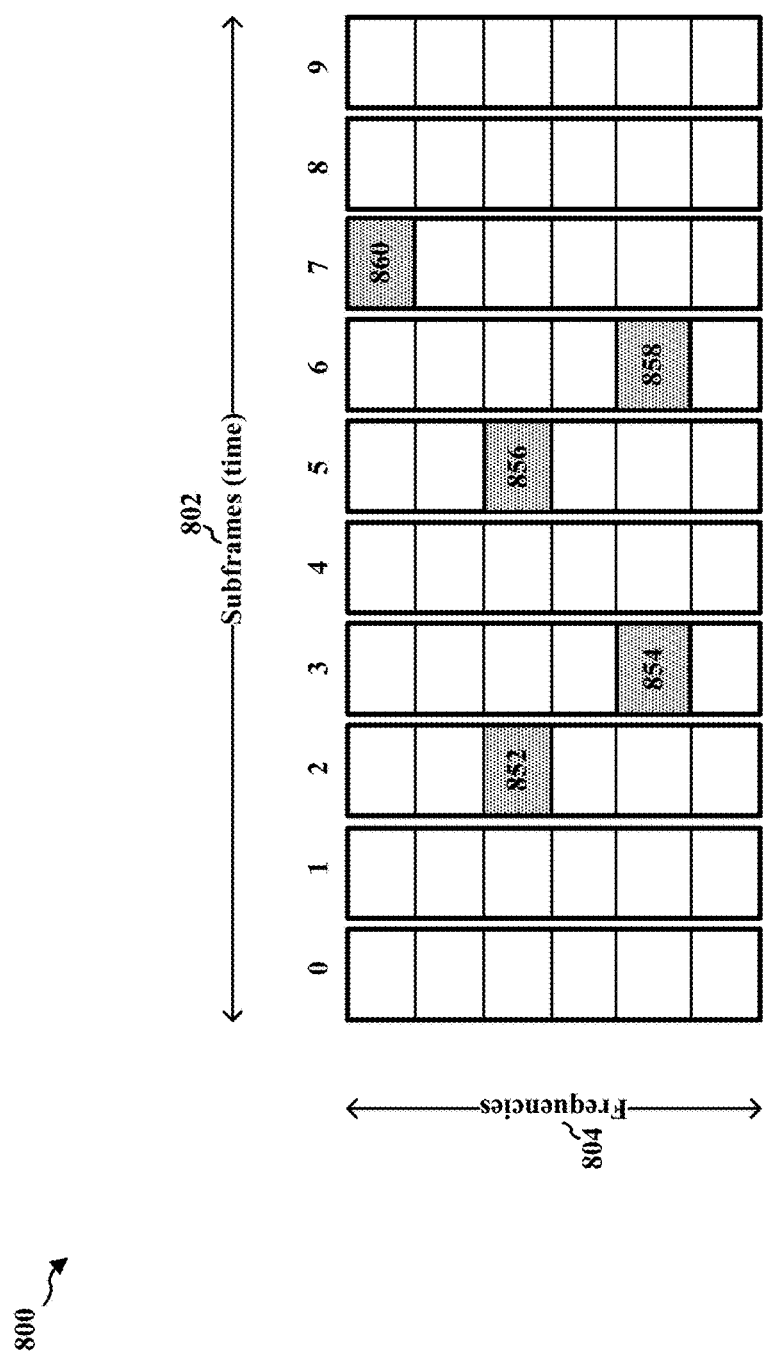
FIG. 8 is an example diagram illustrating an energy level over time and frequency, according to a second aspect of the disclosure.

FIG. 8 is an example diagram 800 illustrating an energy level over time and frequency, according to a second aspect of the disclosure. The horizontal axis 802 represents different subframes and also represents a time domain. The vertical axis 804 represents a frequency domain. In the example diagram 800, the resources are divided into multiple portions. In particular, the resources are divided into different subframes and different frequency blocks. In the example diagram 800, the resources corresponding to blocks 852, 854, 856, 858, and 856 observes low energy (e.g., equal to or less than the energy threshold). If the first approach of the second aspect is used, as discussed above, the device measures energy received on the subframes for LTE over a period of time, and selects a subframe and a frequency that provide low energy. Thus, according to the first approach, the device selects a resource corresponding to one or more of blocks 852, 854, 856, 858, and 856 for transmission. If the second approach of the second aspect is used, the device randomly selects a resource for transmission. Thus, according to the second approach, the device may randomly select any one of the blocks as a resource for transmission.

According a third approach, the device may detect a CUBS before transmission, and determine which frequency resource is occupied based on a frequency resource where the CUBS is received. In one aspect of the third approach, the device may receive the CUBS from one or more other devices before transmission to determine which frequency resource for the target subframe is occupied by the received CUBS. If the device receives the CUBS on the frequency resource, the device may select another frequency resource for the target subframe that is different from the frequency resource occupied by the CUBS. Thus, the device attempts to select a frequency resource that is different from the frequency resource occupied by the received CUBS. Then, the device performs transmission on the target subframe using the selected frequency resource.

In another aspect of the third approach, the device may receive the CUBS from another device before transmission of data to determine which frequency resource for a future subframe following after the current target subframe is to be occupied by data transmission. The device attempts to select a time-frequency resource that is different from the time-frequency resource occupied by the received CUBS. The CUBS may also include information about a future subframe following after the current target subframe. In addition, when the device counts down to 0, the device transmits the CUBS before the next subframe (subframe k) at a preferred frequency resource (e.g., RB x to RB x+1) until the beginning of subframe k, to reserve the preferred frequency resource for transmission on a preferred future subframe (subframe k+m), where m may be any number. The preferred time-frequency resource is different from the time-frequency resource indicated by the CUBS received from another device. Thus, the device transmits data on the future subframe (subframe k+m) at the preferred frequency resource. In an aspect, m may not be a fixed number because different devices may have different m values.

Figure 9:
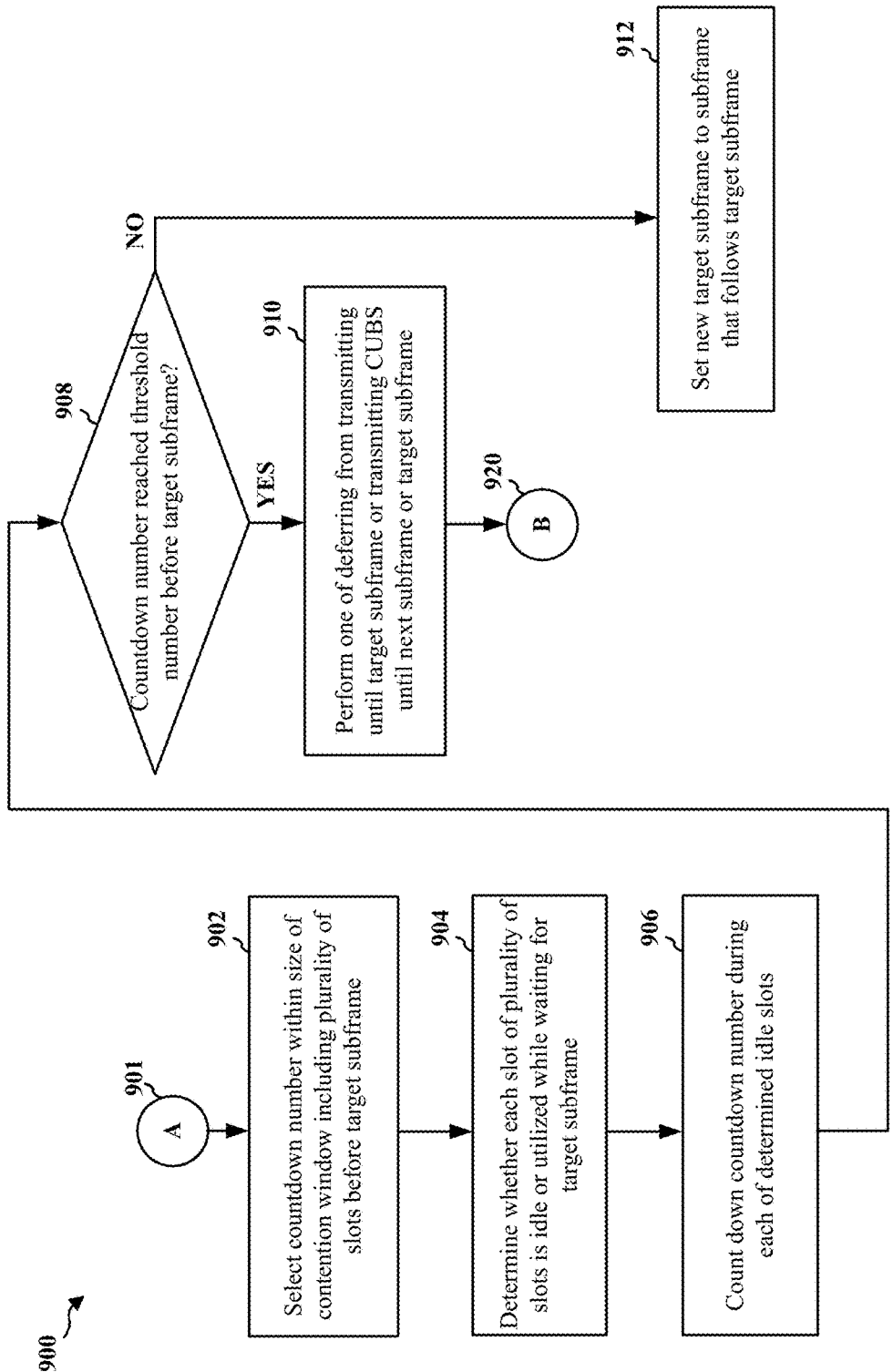
FIG. 9 is a flowchart of a method of wireless communication.

FIG. 9 is a flowchart 900 of a method of wireless communication. The method may be performed by a wireless device (e.g., the UE 101, the first device 512, the apparatus 1302/1302'). At 901, the wireless device may continue after performing other features before 901. At 902, the wireless device selects a countdown number within a size of a contention window including a plurality of slots before a target subframe. For example, as discussed supra, before transmitting LTE V2V communication, a device may (randomly) select a countdown number within the CW size. For example, as discussed supra, each number increment within the CW size may correspond to a slot, and thus the CW size may correspond to the number of slots. At 904, the wireless device determines whether each slot of the plurality of slots is idle or utilized while waiting for the target subframe. For example, as discussed supra, the device determines whether the medium (e.g., the medium corresponding to the slots) is idle or utilized, before reaching the target subframe. At 906, the wireless device counts down the countdown number during each of the determined idle slots.

For example, as discussed supra, if the device determines that the medium is idle, the device will wait until the selected countdown number is counted down to 0 (thus waiting for the wait time) before the transmission. In particular, as discussed supra, the device starts a countdown from the selected countdown number when the medium becomes idle.

At 908, the wireless device determines whether the countdown number has reached a threshold number before the target subframe. For example, as discussed supra, the device may determine whether the countdown reaches a certain threshold number (e.g., 1). When the countdown number is determined to have reached the threshold number before the target subframe, at 910, the wireless device performs one of deferring from transmitting until the target subframe or transmitting a CUBS until a next subframe or the target subframe. For example, as discussed supra, if the countdown reaches the threshold number (e.g., 1) before reaching the target subframe, two different methods of self-deferring may be employed to utilize the target subframe for transmission. According to a first method, as discussed supra, if the countdown reaches a threshold number (e.g., 1) before reaching the target subframe, the device may defer the countdown until the subframe boundary for the target subframe is reached. According to a second method, as discussed supra, if the countdown reaches a threshold number (e.g., 1) before reaching the target subframe, the device may proceed to counting down to 0 and then transmit a CUBS until the subframe boundary for the target subframe is reached. The wireless device may perform additional features at 920. In an aspect, the wireless device may transmit on the target subframe after 910.

When the countdown number is determined not to have reached the threshold number before the target subframe, at 912, the wireless device sets a new target subframe to a subframe that follows the target subframe. In an aspect, the wireless device may transmit on the new target subframe after 912. For example, as discussed supra, if the countdown has not reached a threshold number (e.g., 1) when the target subframe is reached, a third method may be implemented to utilize a next subframe that is subsequent to the target subframe for transmission.

In an aspect, the countdown number may be selected based on at least one of a geographic area of the wireless device or a time. For example, as discussed supra, the countdown number n may be the same for all devices as a function of a current time. For example, as discussed supra, the countdown number n may be the same for all devices within a same geographical area, In an aspect, subframes including the target subframe may be non-contiguous subframes, with gaps between the subframes. In an aspect, a configuration of the gaps between the subframes may be pre-defined or may be received from a base station. For example, as discussed supra, subframes may not be contiguous, and thus may have a time gap between the subframes so as to allow time for one or more of transmission-reception turnaround, a distributed coordination function (DCF) interframe space (DIFS), and sensing time. For example, as discussed supra, the time gap may be pre-configured at the device or may be configured by a base station In an aspect, the size of the contention window may be fixed. In an aspect, a fixed number for the size of the contention window may be preconfigured or may be received from a base station. For example, as discussed supra, according to a first approach of the first aspect, a size of the contention window may be a fixed window size. For example, as discussed supra, a fixed number for the size of the contention window may be preconfigured or may be configured by a base station.

Figure 10:
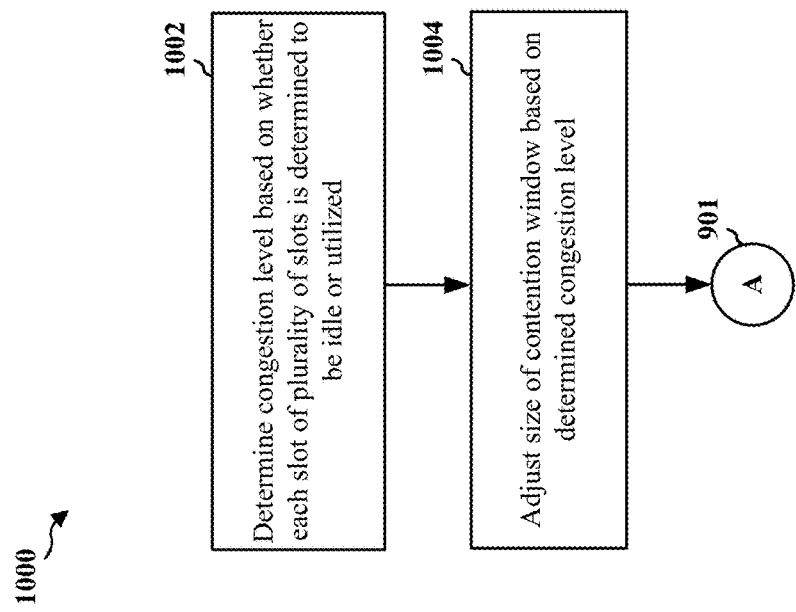
FIG. 10 is a flowchart of a method of wireless communication, expanding from the flowchart of FIG. 9.

FIG. 10 is a flowchart 1000 of a method of wireless communication, expanding from the flowchart 900 of FIG. 9. The method may be performed by a wireless device (e.g., the UE 101, the first device 512, the apparatus 1302/1302'). At 1002, the wireless device determines a congestion level based on whether each slot of the plurality of slots is determined to be idle or utilized. At 1004, the wireless device adjusts the size of the contention window based on the determined congestion level. For example, as discussed supra, according to the second approach of the first aspect, the size of the contention window may vary (e.g., based on a congestion level). In particular, for example, as discussed supra, if a congestion level is high (e.g., due to a large number of devices attempting to transmit), the device may increase the size of the contention window. At 901, the wireless device may proceed to perform additional features, such as the features in the flowchart 900 of FIG. 9. In an aspect, the wireless device adjusts the size of the contention window by increasing the size of the contention window when the determined congestion level is greater than a threshold congestion level. In an aspect, the threshold congestion level is preconfigured or is received from a base station. For example, as discussed supra, the congestion level may be estimated based on a number of interruptions (e.g., due to a busy resource) in countdown of the countdown number. Thus, for a higher number of interruptions, the device determines that the congestion level is high, and thus increases the size of the contention window. For example, as discussed supra, if the number of interruptions exceeds a threshold number, then the device may increase the window size for the contention window (e.g., by doubling the window size of the contention window). For example, as discussed supra, the threshold number may be preconfigured or is received from a base station.

Figure 11:
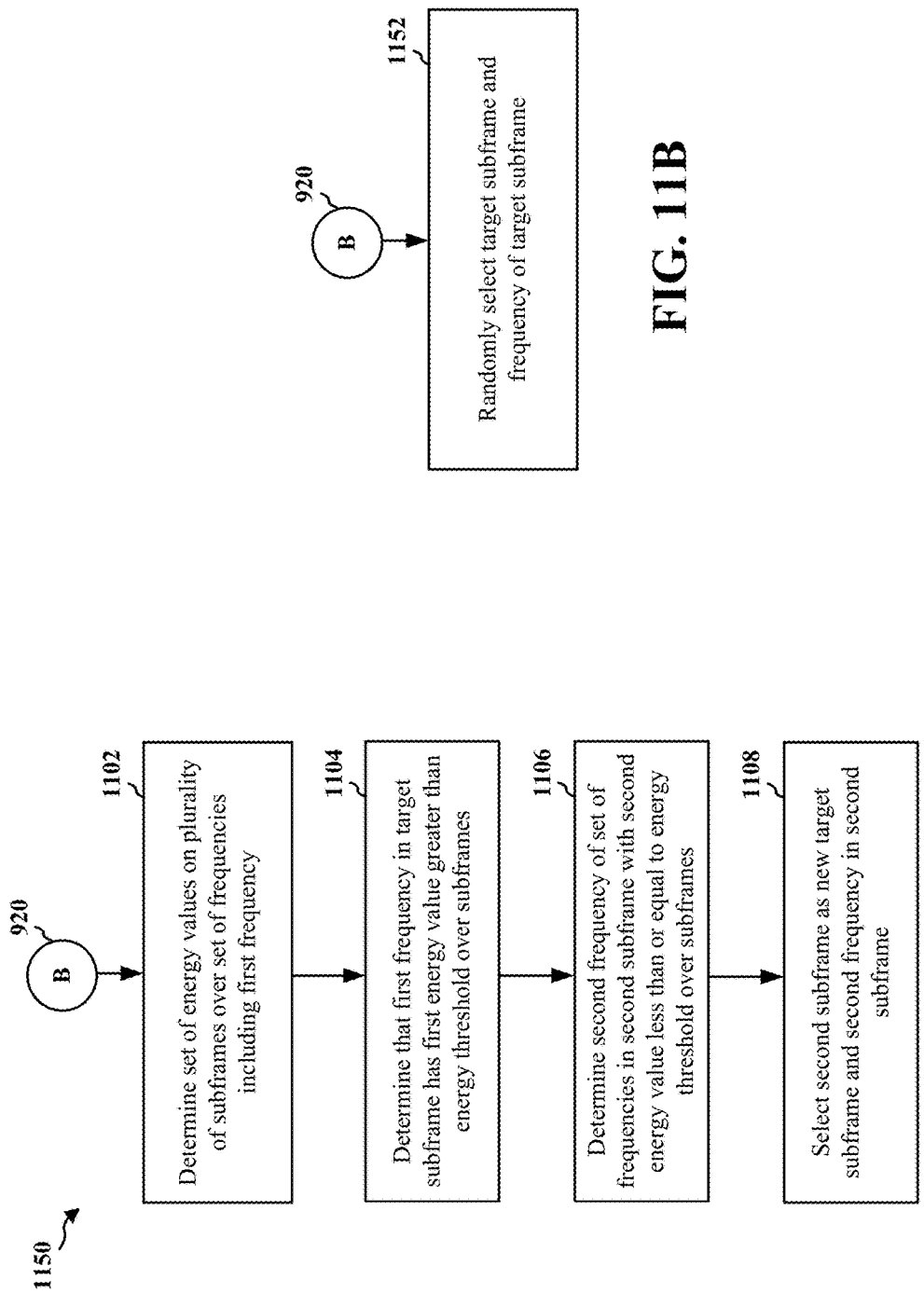
FIG. 11A is a flowchart of a method of wireless communication, expanding from the flowchart of FIG. 9.
FIG. 11B is a flowchart of a method of wireless communication, expanding from the flowchart of FIG. 9.

FIG. 11A is a flowchart 1100 of a method of wireless communication, expanding from the flowchart 900 of FIG. 9. The method may be performed by a wireless device (e.g., the UE 101, the first device 512, the apparatus 1302/1302'). At 920, the wireless device may continue from the flowchart 900 of FIG. 9. In the aspect of the flowchart 1100, the target subframe may be associated with a first frequency. At 1102, the wireless device determines a set of energy values on a plurality of subframes over a set of frequencies including the first frequency. At 1102, the wireless device determines that the first frequency in the target subframe has a first energy value greater than an energy threshold over the subframes. At 1102, the wireless device determines a second frequency of the set of frequencies in a second subframe with a second energy value less than or equal to the energy threshold over the subframes. At 1102, the wireless device selects the second subframe as a new target subframe and the second frequency in the second subframe. In an aspect, the energy threshold is preconfigured or is received from a base station. For example, as discussed supra, according to a first approach of the second aspect, the device measures energy received on the subframes for LTE over a period of time (e.g., 100 msec, where each subframe is 1 msec long), and selects a subframe and a frequency that provide low received energy. For example, as discussed supra, if the device has not selected a target subframe, the device may select a target subframe and a frequency in the target subframe that provide a low energy level. For example, as discussed supra, the device may determine that the energy level is low if the energy level is less than or equal to an energy threshold. For example, as discussed supra, if the device already has determined a target subframe, the device may determine whether the energy level at the target subframe and a frequency for the target subframe is high (e.g., greater than the energy threshold), If the energy level at the target subframe and at the frequency for the target subframe is high (e.g., greater than the energy threshold), the device may reselect another subframe as a new target subframe. For example, as discussed supra, in such an instance, the device may reselect another subframe and a frequency that provide low energy level (e.g., less than or equal to the energy threshold).

Figure 12:
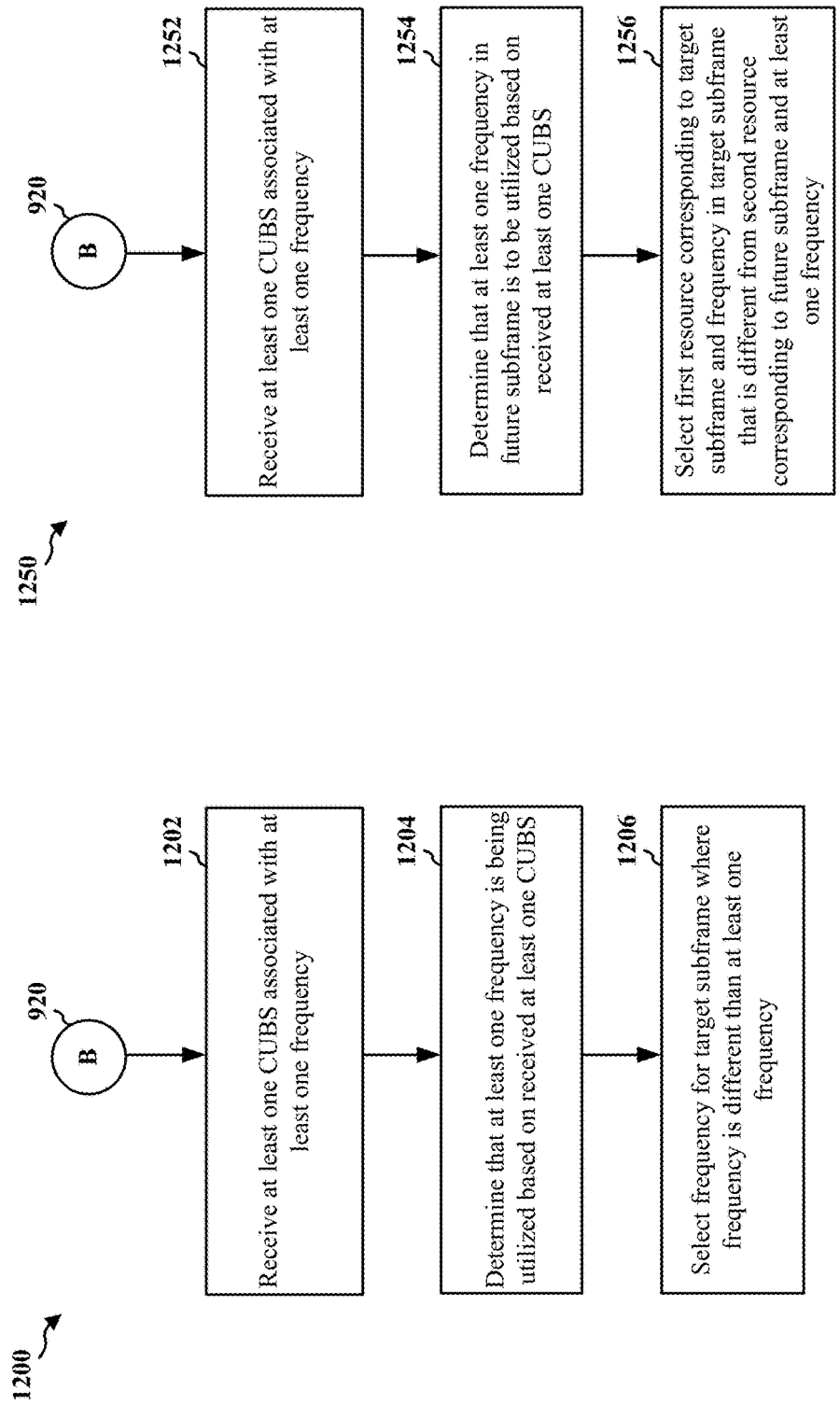
FIG. 12A is a flowchart of a method of wireless communication, expanding from the flowchart of FIG. 9.
FIG. 12B is a flowchart of a method of wireless communication, expanding from the flowchart of FIG. 9.

FIG. 11B is a flowchart 1150 of a method of wireless communication, expanding from the flowchart 900 of FIG. 9. The method may be performed by a wireless device (e.g., the UE 101, the first device 512, the apparatus 1302/1302'). At 920, the wireless device may continue from the flowchart 900 of FIG. 9. At 1052, the wireless device randomly selects the target subframe and a frequency of the target subframe. For example, as discussed supra, according to a second approach of the second aspect, the device may randomly select a target subframe and a frequency for the target subframe FIG. 12A is a flowchart 1200 of a method of wireless communication, expanding from the flowchart 900 of FIG. 9. The method may be performed by a wireless device (e.g., the UE 101, the first device 512, the apparatus 1302/1302'). At 920, the wireless device may continue from the flowchart 900 of FIG. 9. At 1202, the wireless device receive at least one CUBS associated with at least one frequency. At 1204, the wireless device determines that the at least one frequency is being utilized based on the received at least one CUBS. At 1206, the wireless device selects a frequency for the target subframe where the frequency is different than the at least one frequency. For example, as discussed supra, according a third approach, the device may detect a CUBS before transmission, and determine which frequency resource is occupied based on a frequency resource where the CUBS is received. For example, as discussed supra, if the device receives the CUBS on the frequency resource, the device may select another frequency resource for the target subframe that is different from the frequency resource occupied by the CUBS. Thus, the device attempts to select a frequency resource that is different from the frequency resource occupied by the received CUBS.

FIG. 12B is a flowchart 1250 of a method of wireless communication, expanding from the flowchart 900 of FIG. 9. The method may be performed by a wireless device (e.g., the UE 101, the first device 512, the apparatus 1302/1302'). At 920, the wireless device may continue from the flowchart 900 of FIG. 9. At 1252, the wireless device receives at least one CUBS associated with at least one frequency. At 1254, the wireless device determines that the at least one frequency in a future subframe is to be utilized based on the received at least one CUBS. At 1254, the wireless device selects a first resource corresponding to the target subframe and a frequency in the target subframe that is different from a second resource corresponding to the future subframe and the at least one frequency. For example, as discussed supra, in another aspect of the third approach, the device may receive the CUBS from another device before transmission of data to determine which frequency resource for a future subframe following after the current target subframe is to be occupied by data transmission. For example, as discussed supra, the device attempts to select a time-frequency resource that is different from the time-frequency resource to be occupied by the received CUBS.

Figure 13:
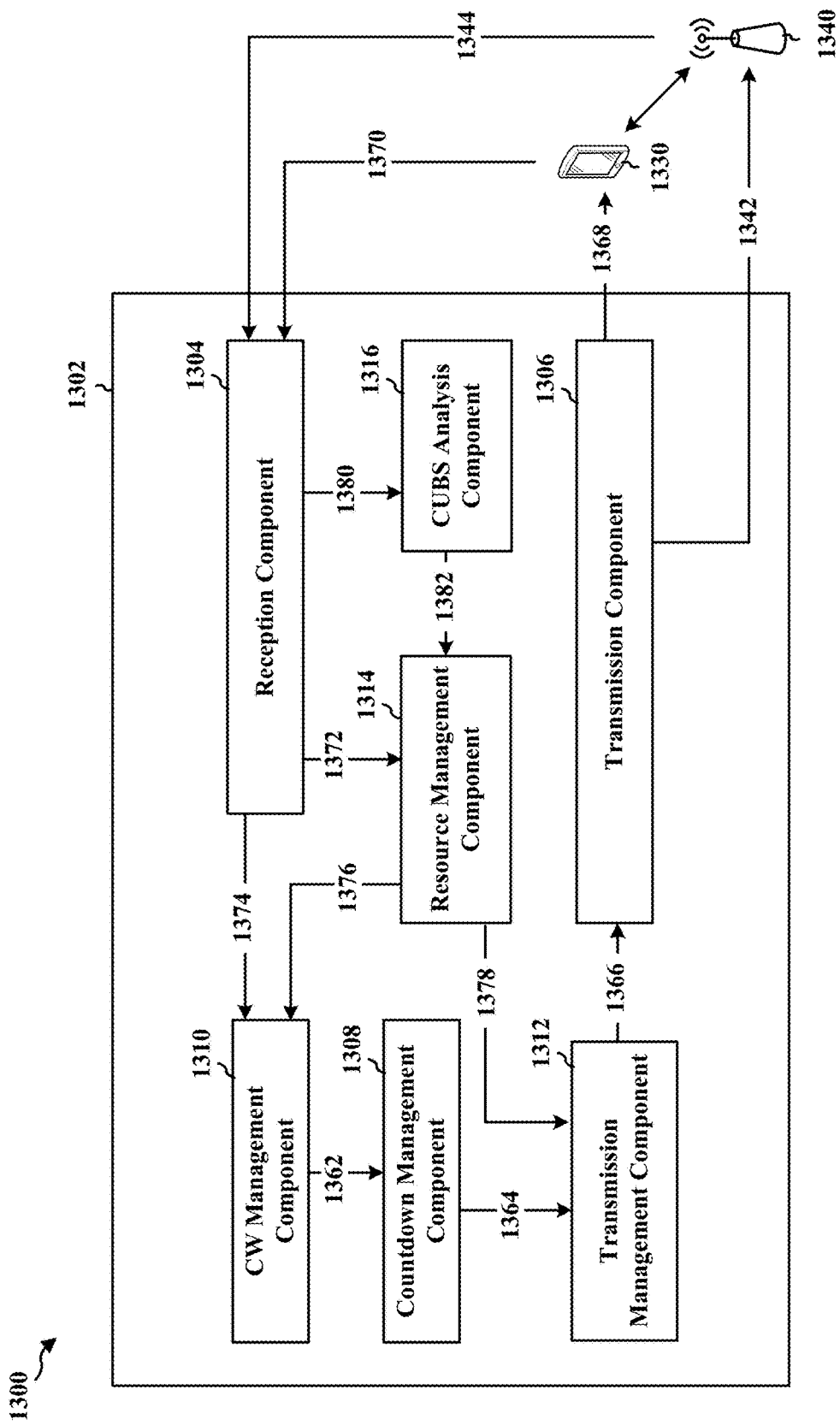
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a wireless device. The apparatus includes a reception component 1304, a transmission component 1306, a countdown management component 1308, a CW management component 1310, a transmission management component 1312, a resource management component 1314, and a CUBS analysis component 1316. The wireless device may communicate with a base station 1340 via the reception component 1304 and the transmission component 1306, at 1342 and 1344.

The countdown management component 1308 selects a countdown number within a size of a contention window including a plurality of slots before a target subframe. The countdown management component 1308 may receive information about the contention window from the CW management component 1310, at 1362. The countdown management component 1308 determines whether each slot of the plurality of slots is idle or utilized while waiting for the target subframe. The countdown management component 1308 counts down the countdown number during each of the determined idle slots. The countdown management component 1308 determines whether the countdown number has reached a threshold number before the target subframe. When the countdown number is determined to have reached the threshold number before the target subframe, the transmission management component 1312 performs one of deferring from transmitting until the target subframe or transmitting a CUBS until a next subframe or the target subframe. The transmission management component 1312 may receive information about the countdown from the countdown management component 1308, at 1364. In an aspect, the transmission management component 1312 may transmit via the transmission component 1306 on the target subframe, at 1366 (e.g., to a second wireless device 1330 via the transmission component 1306 at 1368). When the countdown number is determined not to have reached the threshold number before the target subframe, the transmission management component 1312 sets a new target subframe to a subframe that follows the target subframe. In an aspect, the transmission management component 1312 may transmit via the transmission component 1306 on the new target subframe, at 1366 (e.g., to the second wireless device 1330 via the transmission component 1306 at 1368).

In an aspect, the countdown number is selected based on a geographic area of the wireless device. In an aspect, the countdown number is selected based on a time.

In an aspect, subframes including the target subframe are non-contiguous subframes, with gaps between the subframes. In an aspect, a configuration of the gaps between the subframes is pre-defined or is received from a base station (e.g., from the base station 1340, via the reception component 1304 and the resource management component 1314, at 1370 and 1372).

In an aspect, the size of the contention window is fixed. In an aspect, a fixed number for the size of the contention window is preconfigured or is received from a base station (e.g., from the base station 1340, via the reception component 1304 and the CW management component 1310, at 1370 and 1374).

The resource management component 1314 determines a congestion level based on whether each slot of the plurality of slots is determined to be idle or utilized (e.g., via the reception component 1304 at 1370 and 1372). The resource management component 1314 may forward information on the congestion level to the CW management component 1310 at 1376. The CW management component 1310 adjusts the size of the contention window based on the determined congestion level. In an aspect, the CW management component 1310 adjusts the size of the contention window by increasing the size of the contention window when the determined congestion level is greater than a threshold congestion level. In an aspect, the threshold congestion level is preconfigured or is received from a base station.

In an aspect, the target subframe is associated with a first frequency. In this aspect, the resource management component 1314 determines a set of energy values on a plurality of subframes over a set of frequencies including the first frequency (e.g., via the reception component 1304 at 1370 and 1372). The resource management component 1314 determines that the first frequency in the target subframe has a first energy value greater than an energy threshold over the subframes. The resource management component 1314 determines a second frequency of the set of frequencies in a second subframe with a second energy value less than or equal to the energy threshold over the subframes. The resource management component 1314 selects the second subframe as a new target subframe and the second frequency in the second subframe. In an aspect, the energy threshold is preconfigured or is received from a base station (e.g., from the base station 1340, via the reception component 1304 and the resource management component 1314, at 1370 and 1372). The resource management component 1314 may forward information on the second subframe and the second frequency to the transmission management component 1312 at 1378.

In an aspect, the resource management component 1314 randomly selects the target subframe and a frequency of the target subframe. The resource management component 1314 may forward information on selected target subframe and the frequency to the transmission management component 1312 at 1378.

In an aspect, the CUBS analysis component 1316 receive, via the reception component 1304, at least one CUBS associated with at least one frequency, at 1370 and 1380. The CUBS analysis component 1316 determines that the at least one frequency is being utilized based on the received at least one CUBS. The CUBS analysis component 1316 may forward information about the at least one frequency to the resource management component 1314, at 1382. The resource management component 1314 selects a frequency for the target subframe where the frequency is different than the at least one frequency.

In an aspect, the CUBS analysis component 1316 receives, via the reception component 1304, at least one CUBS associated with at least one frequency, at 1370 and 1380. The CUBS analysis component 1316 determines that the at least one frequency in a future subframe is to be utilized based on the received at least one CUBS. The CUBS analysis component 1316 may forward information about the at least one frequency to the resource management component 1314, at 1382. The resource management component 1314 selects a first resource corresponding to the target subframe and a frequency in the target subframe that is different from a second resource corresponding to the future subframe and the at least one frequency.

The apparatus may include additional components that perform each of the blocks of the algorithm in the aforementioned flowcharts of FIGS. 9-12. As such, each block in the aforementioned flowcharts of FIGS. 9-12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
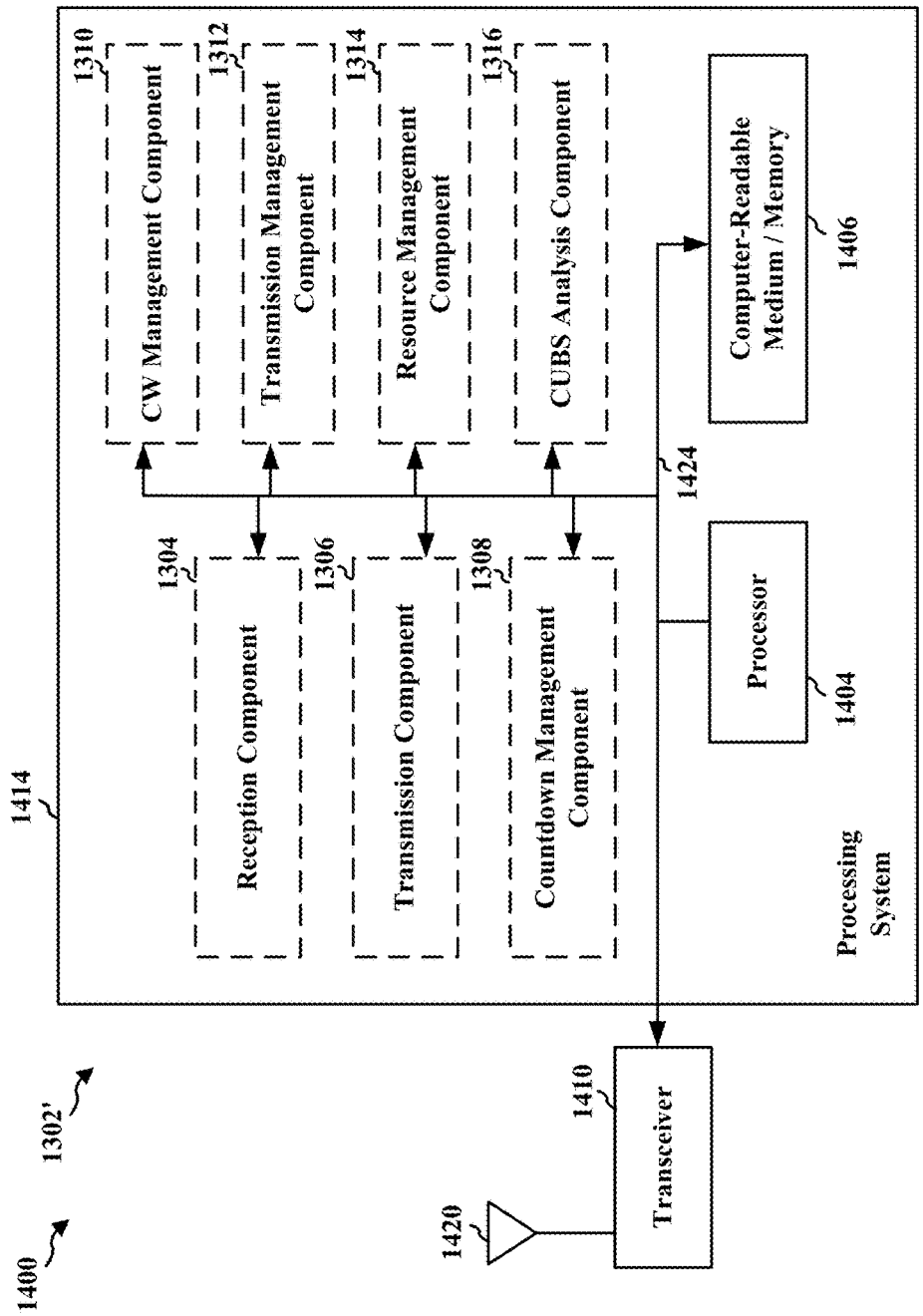
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312, 1314, 1316 and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1306, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1312, 1314, 1316. The components may be software components running in the processor 1404, resident/stored in the computer readable medium/memory 1406, one or more hardware components coupled to the processor 1404, or some combination thereof. The processing system 1414 may be a component of the UE 350 and may include the memory 360 and/or at least one of the TX processor 368, the RX processor 356, and the controller/processor 359.

In one configuration, the apparatus 1302/1302' for wireless communication includes means for selecting a countdown number within a contention window including a plurality of slots before a target subframe, means for determining whether each slot of the plurality of slots is idle or utilized while waiting for the target subframe, means for counting down the countdown number during each of the determined idle slots, means for determining whether the countdown number has reached a threshold number before the target subframe, and means for performing, when the countdown number is determined to have reached the threshold number, one of: deferring from transmitting until the target subframe, or transmitting a CUBS until a next subframe or the target subframe. In an aspect, the apparatus 1302/1302' may further include means for transmitting on the target subframe. In an aspect, the apparatus 1302/1302' may further include. In an aspect, the apparatus 1302/1302' may further include means for setting a new target subframe to a subframe that follows the target subframe when the countdown number is determined not to have reached the threshold number before the target subframe.

In an aspect, the apparatus 1302/1302' may further include means for determining a congestion level based on whether each slot of the plurality of slots is determined to be idle or utilized, and means for adjusting a size of the contention window based on the determined congestion level. In such an aspect, the means for adjusting the size of the contention window is configured to increase the size of the contention window when the determined congestion level is greater than a threshold congestion level. In an aspect, the target subframe may be associated with a first frequency, and the apparatus 1302/1302' may further include means for determining a set of energy values on a plurality of subframes over a set of frequencies including the first frequency, means for determining that the first frequency in the target subframe has a first energy value greater than an energy threshold over the subframes, means for determining a second frequency of the set of frequencies in a second subframe with a second energy value less than or equal to the energy threshold over the subframes, and means for selecting the second subframe as a new target subframe and the second frequency in the second subframe. In an aspect, the apparatus 1302/1302' may further include means for randomly selecting the target subframe and a frequency of the target subframe.

In an aspect, the apparatus 1302/1302' may further include means for receiving at least one CUBS associated with at least one frequency, means for determining that the at least one frequency is being utilized based on the received at least one CUBS, and means for selecting a frequency for the target subframe where the frequency is different than the at least one frequency. In an aspect, the apparatus 1302/1302' may further include means for receiving at least one CUBS associated with at least one frequency, means for determining that the at least one frequency in a future subframe is to be utilized based on the received at least one CUBS, and means for selecting a first resource corresponding to the target subframe and a frequency in the target subframe that is different from a second resource corresponding to the future subframe and the at least one frequency.

The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a wireless device, comprising:
   determining a set of energy values on a plurality of subframes over a set of frequencies including a first frequency, wherein a target subframe is associated with the first frequency, wherein the target subframe and first frequency provide a low received energy level that is less than or equal to an energy threshold;
   selecting a countdown number within a size of a contention window including a plurality of slots before the target subframe;
   determining whether each slot of the plurality of slots is idle or utilized while waiting for the target subframe;
   counting down the countdown number during each of the determined idle slots;
   determining a congestion level based on a number of interruptions during the countdown of the countdown number;
   adjusting the size of the contention window based on the determined congestion level;
   determining whether the countdown number has reached a threshold number before reaching the target subframe; and
   performing, when the countdown number is determined to have reached the threshold number, one of:
      deferring from transmitting until the target subframe is reached, or
      transmitting a channel usage beacon signal (CUBS) until a next subframe or the target subframe is reached.

2. The method of claim 1, further comprising transmitting a control or data message on the target subframe.

3. The method of claim 1, further comprising setting a new target subframe to a subframe that follows the target subframe when the countdown number is determined not to have reached the threshold number before the target subframe.

4. The method of claim 1, wherein the countdown number is selected based on at least one of a geographic area of the wireless device or as a function of a current time.

5. The method of claim 1, wherein subframes including the target subframe are non-contiguous subframes, with gaps between the subframes.

6. The method of claim 1, further comprising:
   determining the congestion level based on whether each slot of the plurality of slots is determined to be idle or utilized.

7. The method of claim 6, wherein the adjusting the size of the contention window comprises increasing the size of the contention window when the determined congestion level is greater than a threshold congestion level.

8. The method of claim 1, further comprising:
   determining that the first frequency in the target subframe has a first energy value greater than an energy threshold over the subframes;
   determining a second frequency of the set of frequencies in a second subframe with a second energy value less than or equal to the energy threshold over the subframes; and
   selecting the second subframe as a new target subframe and the second frequency in the second subframe.

9. The method of claim 1, further comprising randomly selecting the target subframe and a frequency of the target subframe.

10. The method of claim 1, further comprising:
    receiving at least one CUBS associated with at least one frequency;
    determining that the at least one frequency is being utilized based on the received at least one CUBS; and
    selecting a frequency for the target subframe where the frequency is different than the at least one frequency.

11. The method of claim 1, further comprising:
    receiving at least one CUBS associated with at least one frequency;
    determining that the at least one frequency in a future subframe is to be utilized based on the received at least one CUBS; and
    selecting a first resource corresponding to the target subframe and a frequency in the target subframe that is different from a second resource corresponding to the future subframe and the at least one frequency.

12. A wireless device for wireless communication, comprising:
    a memory; and
    at least one processor coupled to the memory and configured to:
       determine a set of energy values on a plurality of subframes over a set of frequencies including a first frequency, wherein a target subframe is associated with the first frequency, wherein the target subframe and first frequency provide a low received energy level that is less than or equal to an energy threshold;

select a countdown number within a size of a contention window including a plurality of slots before the target subframe;
determine whether each slot of the plurality of slots is idle or utilized while waiting for the target subframe;
count down the countdown number during each of the determined idle slots;
determine a congestion level based on a number of interruptions during the countdown of the countdown number;
adjusting the size of the contention window based on the determined congestion level;
determine whether the countdown number has reached a threshold number before reaching the target subframe; and
perform, when the countdown number is determined to have reached the threshold number, one of:
deferring from transmitting until the target subframe is reached, or
transmitting a channel usage beacon signal (CUBS) until a next subframe or the target subframe is reached.

13. The wireless device of claim 12, wherein the at least one processor is further configured to transmit a control or data message on the target subframe.

14. The wireless device of claim 12, wherein the at least one processor is further configured to set a new target subframe to a subframe that follows the target subframe when the countdown number is determined not to have reached the threshold number before the target subframe.

15. The wireless device of claim 12, wherein the countdown number is selected based on at least one of a geographic area of the wireless device or as a function of a current time.

16. The wireless device of claim 12, wherein subframes including the target subframe are non-contiguous subframes, with gaps between the subframes.

17. The wireless device of claim 12, wherein the at least one processor is further configured to:
determine the congestion level based on whether each slot of the plurality of slots is determined to be idle or utilized.

18. The wireless device of claim 17, wherein the at least one processor configured to adjust the size of the contention window is configured to increase the size of the contention window when the determined congestion level is greater than a threshold congestion level.

19. The wireless device of claim 12, wherein the at least one processor is further configured to:
determine that the first frequency in the target subframe has a first energy value greater than an energy threshold over the subframes;
determine a second frequency of the set of frequencies in a second subframe with a second energy value less than or equal to the energy threshold over the subframes; and
select the second subframe as a new target subframe and the second frequency in the second subframe.

20. The wireless device of claim 12, wherein the at least one processor is further configured to randomly select the target subframe and a frequency of the target subframe.

21. The wireless device of claim 12, wherein the at least one processor is further configured to:
receive at least one CUBS associated with at least one frequency;
determine that the at least one frequency is being utilized based on the received at least one CUBS; and
select a frequency for the target subframe where the frequency is different than the at least one frequency.

22. The wireless device of claim 12, wherein the at least one processor is further configured to:
receive at least one CUBS associated with at least one frequency;
determine that the at least one frequency in a future subframe is to be utilized based on the received at least one CUBS; and
select a first resource corresponding to the target subframe and a frequency in the target subframe that is different from a second resource corresponding to the future subframe and the at least one frequency.

23. A wireless device for wireless communication, comprising:
means for determining a set of energy values on a plurality of subframes over a set of frequencies including a first frequency, wherein a target subframe is associated with the first frequency, wherein the target subframe and first frequency provide a low received energy level that is less than or equal to an energy threshold;
means for selecting a countdown number within a size of a contention window including a plurality of slots before the target subframe;
means for determining whether each slot of the plurality of slots is idle or utilized while waiting for the target subframe;
means for counting down the countdown number during each of the determined idle slots;
means for determining a congestion level based on a number of interruptions during the countdown of the countdown number;
means for adjusting the size of the contention window based on the determined congestion level;
means for determining whether the countdown number has reached a threshold number before reaching the target subframe; and
means for performing, when the countdown number is determined to have reached the threshold number, one of:
deferring from transmitting until the target subframe is reached, or
transmitting a channel usage beacon signal (CUBS) until a next subframe or the target subframe is reached.

24. The wireless device of claim 23, further comprising means for transmitting a control or data message on the target subframe.

25. The wireless device of claim 23, further comprising means for setting a new target subframe to a subframe that follows the target subframe when the countdown number is determined not to have reached the threshold number before the target subframe.

26. The wireless device of claim 23, said means for determining the congestion level, further configured to determine the congestion level based on whether each slot of the plurality of slots is determined to be idle or utilized.

27. The wireless device of claim 26, wherein the means for adjusting the size of the contention window is configured to increase the size of the contention window when the determined congestion level is greater than a threshold congestion level.

28. A non-transitory computer-readable medium storing computer executable code, comprising code to:
determine a set of energy values on a plurality of subframes over a set of frequencies including a first frequency, wherein a target subframe is associated with the first frequency, wherein the target subframe and first frequency provide a low received energy level that is less than or equal to an energy threshold;

select a countdown number within a size of a contention window including a plurality of slots before the target subframe;

determine whether each slot of the plurality of slots is idle or utilized while waiting for the target subframe;

count down the countdown number during each of the determined idle slots;

determine a congestion level based on a number of interruptions during the countdown of the countdown number;

adjust the size of the contention window based on the determined congestion level;

determine whether the countdown number has reached a threshold number before reaching the target subframe; and perform, when the countdown number is determined to have reached the threshold number, one of:
  deferring from transmitting until the target subframe is reached, or
  transmitting a channel usage beacon signal (CUBS) until a next subframe or the target subframe is reached.

* * * * *